US010057297B2

(12) United States Patent
Shimizu

(10) Patent No.: US 10,057,297 B2
(45) Date of Patent: Aug. 21, 2018

(54) INFORMATION PROCESSING APPARATUS AND INFORMATION PROCESSING METHOD

(71) Applicant: CANON KABUSHIKI KAISHA, Tokyo (JP)

(72) Inventor: Shota Shimizu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 15/099,857

(22) Filed: Apr. 15, 2016

(65) Prior Publication Data

US 2016/0323322 A1 Nov. 3, 2016

(30) Foreign Application Priority Data

Apr. 28, 2015 (JP) ................................ 2015-091435

(51) Int. Cl.
*H04L 29/06* (2006.01)
*H04W 12/02* (2009.01)

(52) U.S. Cl.
CPC ........ *H04L 63/205* (2013.01); *H04L 63/0428* (2013.01); *H04W 12/02* (2013.01)

(58) Field of Classification Search
CPC .................................................... H04L 63/205
USPC ............................................................ 726/1
See application file for complete search history.

(56) References Cited

U.S. PATENT DOCUMENTS 8,437,320 B2 * 5/2013 Tamura ............... H04L 63/0428 370/338
2010/0110921 A1 * 5/2010 Famolari ............... H04W 48/17 370/252

OTHER PUBLICATIONS

"Wireless group policy setting for Windows Vista Microsoft, 2008", http:technet.microsoft.com/en-us/magazine/2007.04.cableguy.aspx, retrieved Jan. 7, 2016.

* cited by examiner

*Primary Examiner* — Longbit Chai
(74) *Attorney, Agent, or Firm* — Fitzpatrick, Cella, Harper & Scinto

(57) ABSTRACT

An information processing apparatus which can prevent reduction of user's usability when securing security by restricting establishing communication by the encryption method having weak encryption strength is provided. The information processing apparatus comprises a communication control unit which establishes communication with a communication relay device in any one encryption method among one or more encryption methods and a display unit. In response to an input for restricting establishing communication by the encryption method which does not satisfy predetermined encryption strength, the information processing apparatus displays a first screen on the display unit in a case where the communication control unit is establishing communication with the communication relay device by the encryption method which does not satisfy the predetermined encryption strength, the first screen indicating that the encryption method used in the communication established between the communication control unit and the communication relay device does not satisfy the predetermined encryption strength.

8 Claims, 5 Drawing Sheets

300
RESTRICT USING THE WEAK ENCRYPTION
301
ON
302
OFF
OK

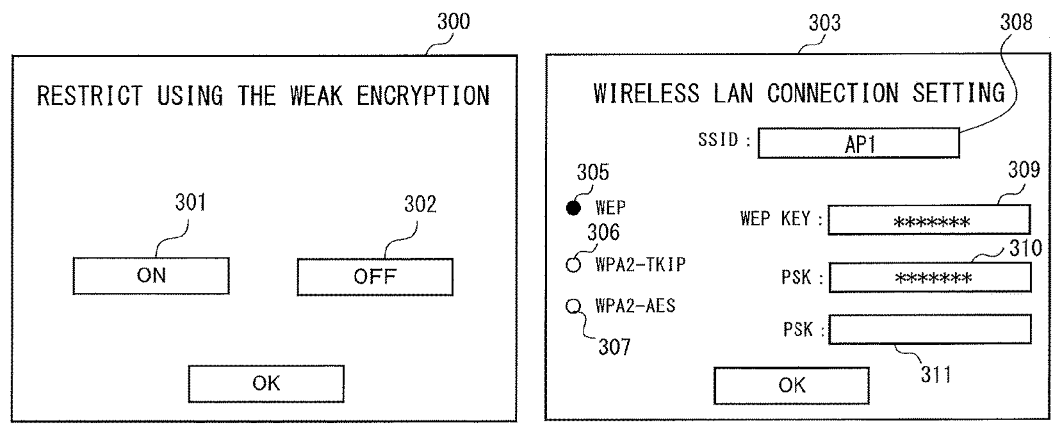
FIG. 3A
FIG. 3B
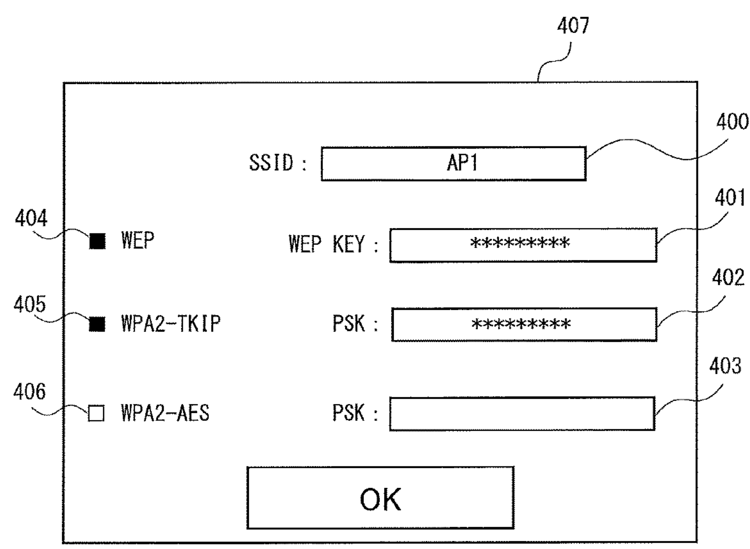
FIG. 4

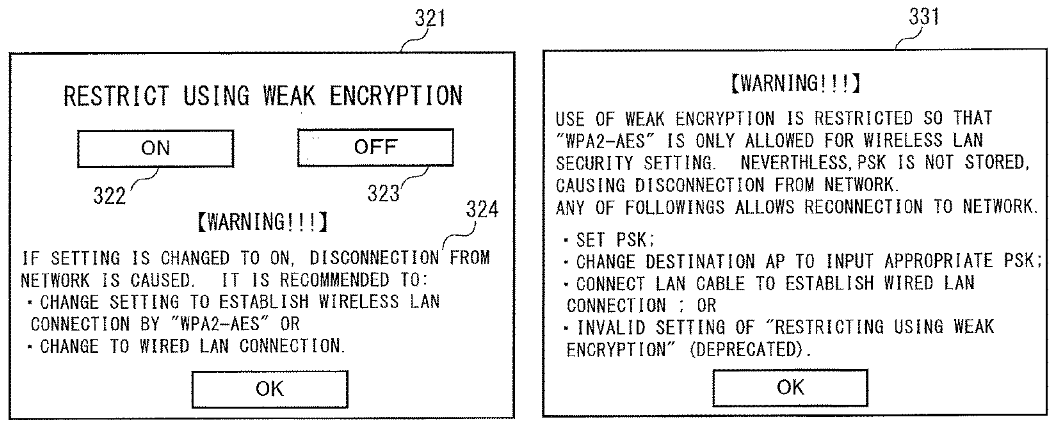
FIG. 6A
FIG. 6B
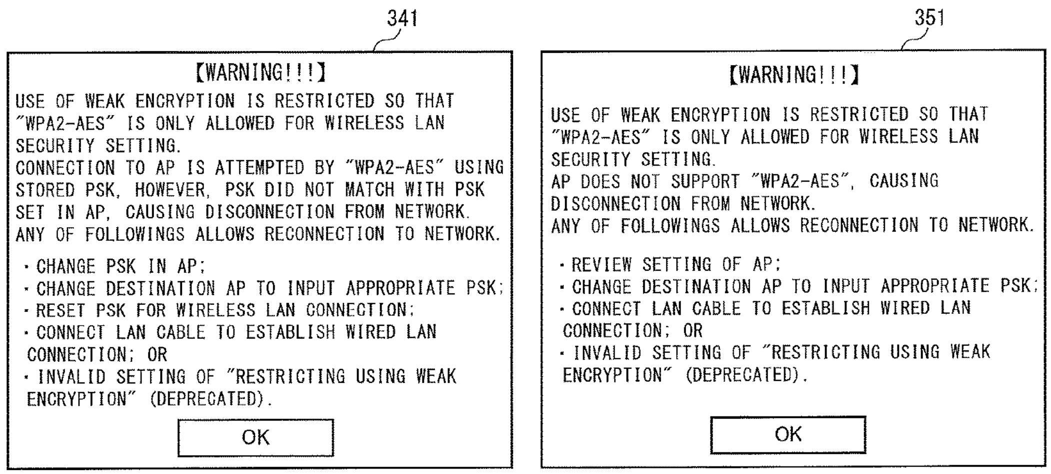
FIG. 6C
FIG. 6D

INFORMATION PROCESSING APPARATUS AND INFORMATION PROCESSING METHOD

BACKGROUND OF THE INVENTION

Field of the Invention

The present disclosure relates to an information processing apparatus and information processing method which establishes communication via a communication relay device such as an access point (AP).

Description of the Related Art

As to an information device which is connected to an in-house network etc., it is desirable to operate it in accordance with predetermined information security policy. The information security policy is a basic policy with regard to information security of an entire company, in which the policy of how to handle information, the policy of how to prevent invasion from outside, and the policy of how to prevent leak of information are put together. The information security policy is developed by a manager who handles security.

One security policy for enhancing security includes restricting using an encryption which does not satisfy predetermined encryption strength. For example, the security policy includes "restricting using a weak encryption". National Institute of Standards and Technology (NIST) issues SP800-57 as a series of Special Publication (SP). To satisfy a security standard defined by the SP800-57, in the policy of "restricting using a weak encryption", using a vulnerable encryption is restricted. It is noted that, in this specification, an encryption method for communication having a key length of less than or equal to 1024 bits is simply described as "weak encryption". By adapting the security policy, in internal processing of the information device, use of the weak encryption is restricted.

In the information device, encryption communication is used in wired or wireless communication. In the following, a description is provided in case of the wireless communication. One method of using the encryption communication in the wireless communication includes a wireless LAN (Local Area Network). There are one or more protocols defined by Wi-Fi Alliance in the wireless LAN. Security strength and the encryption used vary with the protocol. Most of the information devices or APs having the wireless LAN function support one or more protocols. The protocols are differently used depending on the purpose of utilization or required security.

The wireless LAN protocol includes WEP (Wired Equivalent Privacy), WPA (Wi-Fi Protected Access), and WPA2 (Wi-Fi Protected Access 2). WPA and WPA2 can choose the encryption method used. As the encryption method, one of the followings is used, i.e., TKIP (Temporal Key Integrity Protocol) or AES (Advanced Encryption Standard). For example, when AES is used by WPA2, it is noted as WPA2-AES and used as the wireless LAN security setting.

Further, when using the wireless LAN by WEP from the information device, it is required to enter WEP key which is previously set in a communication relay device. Usually, the communication relay device is called an access point (hereinafter described as AP). It is noted that the WEP key is an alphanumeric string which is used as an encryption key for communication. Similarly, when using the wireless LAN by WPA or WPA2 from the information device, it is required to enter PSK (Pre-Shared Key) which is previously set in the AP. The PSK is an alphanumeric string which is used as an encryption key for communication. Among the above, only WPA-AES and WPA2-AES are the settings in which the weak encryption are not used.

"Wireless group policy setting for Windows (Registered Trade Mark) Vista Microsoft, 2008" In the following site, to allow establishing connection to the appropriate AP without any need of user's determination, a method using a whitelist and a blacklist SSID is disclosed. "http://technet.microsoft-.com/en-us/magazine/2007.04.cableguy.aspx"

In this method, a network manager distributes blacklist or whitelist. Then, only the appropriate AP is displayed. As a result, a user is not allowed to use the wireless LAN in which SSID is not displayed.

When the blacklist is adopted, the blacklisted SSID cannot establish the wireless LAN connection. Thereby, by blacklisting the SSID which corresponds to the AP using the weak encryption, the AP using the weak encryption is no longer displayed on the selection screen. This results in preventing a situation in which the user selects the AP using the weak encryption. When the whitelist is adopted, only the whitelisted SSID is displayed on the AP selection screen. Thereby, by only whitelisting the AP not using the weak encryption, the AP using the weak encryption is no longer displayed on the selection screen. This results in preventing a situation in which the user selects the AP using the weak encryption. Thereby, by using the blacklist or the whitelist, when using the wireless LAN, the security policy of "restricting using the weak encryption" is steadily adapted.

In a method of using the blacklist, when the AP using the weak encryption is added, the list needs to be updated. Also, in a method of using the whitelist, when the AP not using the weak encryption is added, the list needs to be updated.

When the added AP is the one using the weak encryption, in the method of using the blacklist, a problem may be caused. In the method of using the blacklist, the AP using the weak encryption is displayed on the selection screen until the blacklist is updated. In this case, if the user selects the AP using the weak encryption, the security may be decreased. Further, when the added AP is the one not using the weak encryption, in the method of using the whitelist, a problem may be caused. This is because, in the method using the whitelist, until the whitelist is updated, the added AP cannot be used so that utility may be reduced.

Further, in either the blacklist or the whitelist, when updating the list, it is a human that determines whether the communication method in the AP uses the weak encryption. Thereby, when the communication method to be listed is wrongly set, the security may be decreased. Then, as a method to realize the security policy of "restricting using the weak encryption", a method to determine, by the information device, content of the security setting for the wireless LAN of the AP can be considered. In this method, the information device determines the content of the security setting for the wireless LAN of the AP. Then, if it is determined that it is the security setting using the weak encryption, the communication is made an error and is disconnected from a network.

In this method, even the AP is added, the information device automatically determines whether the communication method in the added AP is the weak encryption or not. Thereby, the above problem associated with the update of the blacklist or the whitelist does not occur.

On the other hand, in this method, a problem occurs when a state is changed from a state in which the security policy of "restricting using the weak encryption" is not adapted to a state in which the policy is adapted. In a state in which the policy is not adapted, the AP using the weak encryption can also be connected to the network. When the security policy of "restricting using the weak encryption" is adapted to the information device from this state, it is determined that the AP which is establishing the wireless LAN communication using the weak encryption is in the security setting using the weak encryption. Then, the AP is automatically disconnected from the network.

To reconnect the AP having disconnected from the network to the network, it is required to reset the disconnected AP or the above mentioned information device. This largely affects when "restricting using the weak encryption" is wrongly adapted while using the wireless LAN using the weak encryption.

In particular, if the AP is disconnected from the network while remotely operating the information device, to allow re-establishing network connection, an operator of the information device needs to move to the information device to reset. In this case, to ensure the security, usability is considerably reduced.

SUMMARY OF THE INVENTION

The information processing apparatus of the present disclosure which solves the above problem comprises a communication unit configured to establish communication with a communication relay device in one of encryption methods; a reception unit configured to receive a first input from a user for restricting establishing communication with an encryption method which does not satisfy predetermined encryption strength; and a control unit configured to display a first screen on the display unit in a case where the reception unit receives the first input when the communication unit is establishing communication with the communication relay device by the encryption method which does not satisfy the predetermined encryption strength, the first screen indicating that the encryption method used in the communication established between the communication unit and the communication relay device does not satisfy the predetermined encryption strength.

Further features of the present invention will become apparent from the following description of exemplary embodiments (with reference to the attached drawings).

BRIEF DESCRIPTION OF THE DRAWINGS

FIGS. 3A and 3B are exemplary diagrams of a display screen.

FIG. 4 is an exemplary diagram of a setting screen for establishing wireless LAN setting.

FIGS. 6A to 6D are exemplary diagrams of a display screen.

DESCRIPTION OF THE EMBODIMENTS

In the following, embodiments are described in detail with reference to the accompanying drawings.

The present disclosure is mainly directed to provide a technology which can prevent the reduction of user's usability when securing security by restricting (or prohibiting) establishing communication by the encryption method having weak encryption strength.

According to the present disclosure, when restricting communication with an encryption method which does not satisfy predetermined encryption strength, when a user is establishing communication by the encryption method which does not satisfy the encryption strength, the fact is displayed to the user. This results in preventing the reduction of the user's usability while securing security.

Figure 1:
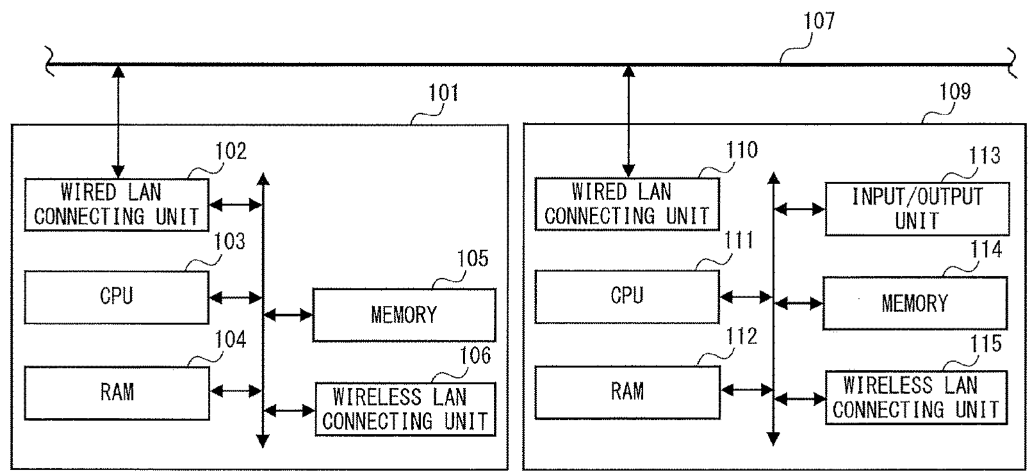
FIG. 1 is a block diagram illustrating a schematic hardware configuration of an information processing apparatus and an AP.

In this embodiment, a description is provided, as an example, in a case where the wireless LAN is used as the encryption communication, however, the encryption communication is not limited to the wireless LAN. FIG. 1 is a block diagram illustrating a schematic hardware configuration of an information processing apparatus which establishes encryption wireless communication and an AP as a communication relay device according to a first embodiment. In FIG. 1, an AP 101 is an access point which establishes communication with a PC 109 through a network 107 by a wired LAN.

The PC 109 comprises a wired LAN connecting unit 110, a central processing unit (CPU) 111, a random access memory (RAM) 112, an input/output unit 113, a memory 114, and a wireless LAN connecting unit 115. The wired LAN connecting unit 110 establishes communication with other information device through the network 107 by the wired LAN. The CPU 111 serves as a control unit which controls each processing in the PC 109. The RAM 112 temporarily stores information such as program codes executed by the CPU 111. The input/output unit 113 functions as a display unit which receives an input from a manager to the PC 109 and outputs warning. The memory 114 is a memory, such as a hard disk etc., for storing the program codes or data. The wireless LAN connecting unit 115 establishes communication with the AP 101 and an external device by the wireless LAN.

In the following, a description is provided with regard to the AP 101. The AP 101 comprises a wired LAN connecting unit 102, a CPU 103, a RAM 104, a memory 105, and a wireless LAN connecting unit 106. The wireless LAN connecting unit 106 establishes communication with the information device using the wireless LAN such as the PC 109. The wired LAN connecting unit 102 establishes communication with other device on the network 107 using communication content of the wireless LAN connecting unit 106. The CPU 103 executes each control in the AP 101. The RAM 104 temporarily stores information such as program codes executed by the CPU 103. The memory 105 is a memory, such as a hard disk etc., for storing the program codes or data.

Figure 2:
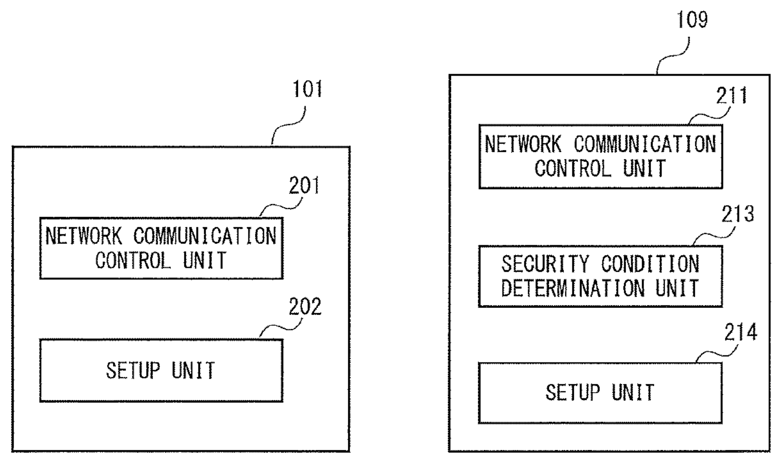
FIG. 2 is a functional block diagram of software.

FIG. 2 is functional block diagrams of software respectively formed by the CPU 103 of the AP 101 and the CPU 111 of the PC 109 according to the present embodiment. As shown, a network communication control unit 201 and a setup unit 202 are formed in the AP 101. Further, a network communication control unit 211, a security condition determination unit 213, and a setup unit 214 are formed in the PC 109.

In the AP 101, the network communication control unit 201 controls communication to the network 107 through the wired LAN connecting unit 102 and the wireless LAN connecting unit 106. The setup unit 202 sets the security policy. Also, the setup unit 202 stores operation setting of the AP 101 and content of setting associated with the wireless LAN connection in the memory 105. In the PC 109, the network communication control unit 211 controls communication to the network 107 through the wired LAN connecting unit 110 and the wireless LAN connecting unit 115. The security condition determination unit 213 determines whether the security setting of the AP to which the PC 109 is connected satisfies predetermined condition or not. In this example, the security condition determination unit 213 determines whether the encryption method in the wireless communication satisfies the predetermined encryption strength. The setup unit 214 sets the security policy. Further, the setup unit 214 displays the operation setting of the PC 109 and a screen for performing setting associated with the wireless LAN communication on the input/output unit 113 and stores the set content in the memory 114.

FIGS. 3A and 3B show operation setting screens in the PC 109. These screens are only an example of a screen displayed on the input/output unit 113 by the setup unit 214 when the setting is changed. In FIG. 3A, the operation setting screen 300 shows the setting screen for executing the security policy of "restricting using the weak encryption". A button 301 is a selection button to turn ON "restricting using the weak encryption". A button 302 is a selection button to turn OFF "restricting using the weak encryption".

In the following description, in a case where the security policy is turned ON in the screen shown in FIG. 3A, the encryption method listed in a weak encryption list stored in the memory 114 or a function using the weak encryption can no longer be used in the PC 109. In the following, List 1, which is an example of the weak encryption list, is shown.

List 1

WEP

WPA2-TKIP

In the above List 1, as the encryption method, "WEP" and "WPA2-TKIP" are described. When the security policy of "restricting using the weak encryption" is turned ON, the encryption method described in the List 1 can no longer be used. What is described in the List 1 is only an example so that other encryption method or function using the weak encryption may be described.

FIG. 3B shows a setting screen 303 when the PC 109 establishes the wireless LAN connection to the AP. In FIG. 3B, an input box 308 is an input box to set SSID for a destination AP. In this example, "AP1" is input in the input box 308, indicating that connection setting to the AP whose SSID is "AP1" (hereinafter simply described as AP1) is established.

In the following, SSID of the AP 101 shown in FIG. 1 is AP1. Checkboxes 305, 306, and 307 show the security settings set in the PC 109. The checkbox 305 corresponds to WEP, the checkbox 306 corresponds to WPA2-TKIP, and the checkbox 307 corresponds to WPA2-AES. In FIG. 3B, the checkbox 305, corresponding to WEP, is checked. It means that, as the security setting, "WEP" is selected when establishing the wireless LAN connection to the AP1.

Input boxes 309 to 311 are input boxes, in each of which an encryption key for WEP, WPA2-TKIP, and WPA2-AES in the respective encryption method is input. The encryption key is an alphanumeric string which is used as an encryption key for the wireless LAN communication. In FIG. 3B, these alphanumeric strings are shown by "*". When the encryption key is input in the input box, it means that the encryption key is set. In this example, in the input box 309, "WEP key" is set. The "WEP key" is an encryption key required when connecting to the AP1 by WEP. When the value does not match with a value set in AP1, the wireless LAN connection cannot be established.

The input box 310 indicates that an encryption key called "Pre-Shared Key (hereinafter referred to as PSK)" is set. The PSK is required when the information device, PC 109, connects to the AP1 by the encryption method of "WPA" or "WPA2". In the example shown in FIG. 3B, "WEP", "WPA2-TKIP", and "WPA2-AES" are the security settings for the wireless LAN available for the PC 109. The encryption keys are input in the input boxes 309 and 310, which respectively correspond to "WEP" and "WPA2-TKIP". However, no encryption key is input in the input box 311, which corresponds to "WPA2-AES".

Back to FIG. 2, the network communication control unit 201 formed in the AP 101 performs control of the wireless LAN connection or communication with other information device through the wireless LAN connecting unit 106. Further, the network communication control unit 201 controls the wired LAN connecting unit 102 to perform control of the communication with other information device via the network 107. Thereby, when the information device establishes the wireless LAN connection to the AP 101 to establish communication with other information device on the network 107, the network communication control unit 201 controls the wireless LAN connecting unit 106 and the wired LAN connecting unit 102 to relay the communication between the information device and the other information device.

The setup unit 202 of the AP 101 transfers the setting screen associated with the wireless LAN communication of the AP 101 to the other information device through the network 107. Thereafter, the setup unit 202 receives the content set by the information device through the network 107 and stores the content in the memory 105 of the AP. The setup unit 202 of the AP 101 operates in accordance with the setting stored in the memory 105. In the following description, the other information device is the PC 109.

In FIG. 4, an operation setting screen 407, which is an example of a screen for performing the wireless LAN setting, is shown. The operation setting screen 407 is displayed on the input/output unit 113 of the PC 109 by the setup unit 214 of the PC 109. In FIG. 4, an input box 400 is an item for setting up SSID for identifying the AP. FIG. 4 shows that "AP1" is set as SSID.

Checkboxes 404, 405, and 406 show the security settings set in the information device. The checkbox 404 corresponds to WEP, the checkbox 405 corresponds to WPA2-TKIP, and the checkbox 406 corresponds to WPA2-AES. In FIG. 4, the checkboxes 404 and 405, respectively corresponding to WEP and WPA2-TKIP, are checked. It means that, as the security setting, "WEP" and "WPA2-TKIP" are selectable when establishing the wireless LAN connection to the AP1.

Input boxes 401, 402 and 403 are input boxes, in each of which an encryption key for WEP, WPA2-TKIP, and WPA2-AES in the respective encryption method is input. Similar to FIG. 3B, these alphanumeric strings are shown by "*" in FIG. 4. When the encryption key is input in the input box, it means that the encryption key is set. In this example, in the input box 401, "WEP key" is set. The "WEP key" is an encryption key required when connecting to the AP1 by WEP. When the value does not match with a value set in AP1, the wireless LAN connection cannot be established. In the input box 402, an encryption key required when the information device connects to the AP1 by the encryption method of "WPA" or "WPA2" is set.

In FIG. 4, the checkbox 404 is checked. It means that the information device can establish the wireless LAN connection to the AP 1 using "WEP" as the encryption method. The WEP key is set in the input box 401. The checkbox 405 is also checked. It means that the information device is allowed to establish the wireless LAN connection to the AP using "WPA2-TKIP". Further, the encryption key is input in the input box 402.

On the other hand, the checkbox 406 is unchecked. It means that, as the encryption method, "WPA2-AES" is not validated in the information device. Further, in the input box 403, no encryption key is input.

Figure 5:
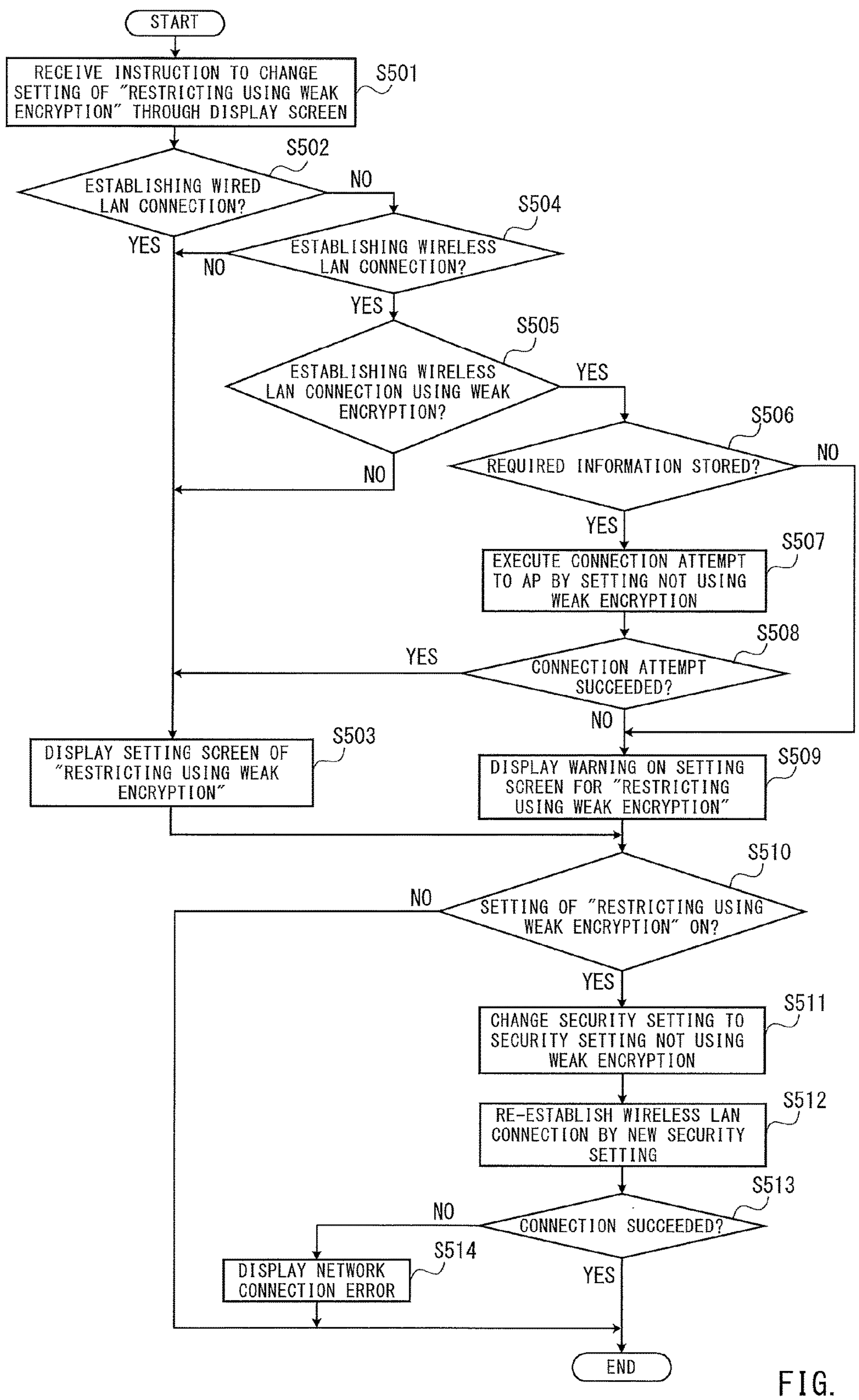
FIG. 5 is a flowchart for processing to display connection candidate AP.

Next, a description is provided in a case where the PC 109 is establishing the connection to the AP 101 using the encryption method of "weak encryption" in a state in which the setting of "restricting using the weak encryption" is invalid. A description is provided, with a flowchart shown in FIG. 5, with regard to processing to change, from this state, to a state in which the setting of "restricting using the weak encryption" is invalid to a state in which the setting is valid. It is noted that all programs associated with the flow shown in FIG. 5 are stored in the memory 114 of the PC 109, which are read by the RAM 112 and executed by the CPU 111. Further, when starting the flowchart shown in FIG. 5, the setting of "restricting using the weak encryption" is invalid.

The setup unit 214 of the PC 109 receives an instruction from a user to change the setting of "restricting using the weak encryption" from invalid to valid through the input/output unit 113 (S501). In response to the instruction to change the setting, to determine whether the PC 109 is establishing the wired LAN connection to the AP 101 or not, the setup unit 214 of the PC 109 gives an instruction to the network communication control unit 211 of the PC 109 to obtain a connection state.

In response to the instruction to obtain the communication state, the network communication control unit 211 notifies the setup unit 214 of the information of whether the PC 109 is establishing the wired LAN connection to the AP 101 or not or establishing the wireless LAN connection to the AP 101 or not. Based on the notification, the setup unit 214 determines whether the PC 109 is establishing the wired LAN connection to the AP 101 or not (S502).

If it is determined that the PC 109 is establishing the wired LAN connection to the AP 101 (S502: Y), the setup unit 214 displays a display screen 300 of "restricting using the weak encryption" as shown in FIG. 3A on the input/output unit 113 of the PC 109 (S503). Thereafter, the setup unit 214 shifts to a processing of S510. If it is determined that the PC 109 is not establishing the wired LAN connection to the AP 101 in the step of S502 (S502: N), based on the notification received from the network communication control unit 211 of the PC 109, the setup unit 214 determines whether the PC 109 is establishing the wireless LAN connection to the AP 101 or not (S504).

If it is determined that the PC 109 is not establishing the wireless LAN connection to the AP 101 (S504: N), the setup unit 214 shifts to the processing of S503. If it is determined that the PC 109 is establishing the wireless LAN connection to the AP 101 (S504: Y), the setup unit 214 gives an instruction to the security condition determination unit 213 of the PC 109 to perform the processing to determine whether the PC 109 is establishing the wireless LAN connection using the weak encryption or not. In response to the instruction, the security condition determination unit 213 compares the wireless LAN security setting and the weak encryption list stored in the memory 114 of the PC 109 to determine if there is any match. Then, the security condition determination unit 213 notifies the result to the setup unit 214. In response to the notification, the setup unit 214 determines whether the PC 109 is establishing the wireless LAN connection to the AP 101 using the weak encryption or not (S505). If it is determined that the weak encryption is not used, the setup unit 214 shifts to the processing of S503.

If it is determined that the PC 109 is establishing the wireless LAN connection to the AP 101 by "WEP" or "WPA2-TKIP", the setup unit 214 determines that the PC 109 is establishing the wireless LAN connection using the weak encryption (S505: Y). In this case, the setup unit 214 shifts to the processing of S506. The setup unit 214 determines whether it is possible to establish the wireless LAN communication by the encryption method which satisfies the predetermined encryption strength or the encryption method which is not the weak encryption. In this example, the setup unit 214 determines whether the information required for establishing the wireless LAN connection not using the weak encryption is stored in the memory 114 of the PC 109 or not (S506). In the PC 109, the security setting of the wireless LAN connection not using the weak encryption is "WPA2-AES". Thereby, the setup unit 214 determines whether the PSK is stored in the memory 114 or not.

If it is determined that the information required to establish the wireless LAN connection not using the weak encryption is not stored in the memory 114 (S506: N), the setup unit 214 shifts to a processing S509 which is described later. If it is determined that the information required to establish the wireless LAN connection not using the weak encryption is stored in the memory 114 (S506: Y), the setup unit 214 gives an instruction to the network communication control unit 211 to attempt to establish the wireless LAN connection by the security setting not using the weak encryption (S507).

In response to the notification, the network communication control unit 211 attempts to connect to the AP with the security setting which does not use the weak encryption through the wireless LAN connecting unit 115. In this embodiment, the security setting not using the weak encryption is "WPA2-AES" so that the connection attempt is executed by this security setting. It is noted that, before executing the step of S507, the setup unit 214 may establish the communication with the AP 101 through the network communication control unit 211 by the encryption method using the current weak encryption. Then, the setup unit 214 may obtain the encryption method for the communication allowed by the AP 101. In this case, it is determined whether at least one of the obtained encryption methods can establish the communication in the PC 109 and matches with the encryption method which satisfies the predetermined strength or not. If it is determined that there is no encryption method which matches, it can be determined that no connection attempt is required and the PC 109 can no longer establish communication with the AP 101 after restricting using the weak encryption. Then, the processing proceeds to the step of S509. If it is determined that there is an encryption method which matches, the setup unit 214 executes the step of S507. In this example, the setup unit 214 executes the step of S507 without obtaining the encryption method for communication allowed by the AP 101 and executes the connection attempt by the encryption method without using the weak encryption. If the AP 101 is allowed to establish the wireless LAN connection by "WPA2-AES" and the PSK stored in the memory 114 matches with the PSK stored in the AP 101, the wireless LAN connection is successfully established. Then, the network communication control unit 211 notifies the success of the communication to the setup unit 214. If the AP 101 is not allowed establishing the wireless LAN connection by "WPA2-AES" or the PSK stored in the PC 109 does not match with the PSK stored in the AP 101, the wireless LAN connection is not established.

In this case, the network communication control unit 211 notifies failure of the communication to the setup unit 214 of the PC 109.

In response to the notification from the network communication control unit 211, the setup unit 214 determines whether the connection attempt is successful or not based on the content of the notification (S508). If the success of the communication is notified from the network communication control unit 211 (S508: Y), the setup unit 214 determines that the connection attempt is successful. Then, the setup unit 214 shifts to the processing of S503. If the failure of the communication is notified from the network communication control unit 211 (S508: N), the setup unit 214 determines that the connection attempt failed. Then, the setup unit 214 shifts to the processing of S509. Thereafter, the setup unit 214 displays a screen 321, illustrated in FIG. 6A, on the input/output unit 113 of the PC 109. The screen 312 shows that the encryption method does not satisfy the predetermined encryption strength (S509). Further, in this example, warning to restrict using the weak encryption is also displayed on the screen 321.

In this example, a normal setting screen of "restricting using the weak encryption" is displayed on the screen 321. A button 322 is a selection button to turn ON "restricting using the weak encryption". A button 323 is a selection button to turn OFF "restricting using the weak encryption". It is also shown in FIG. 6A that, as a result of changing the setting of "restricting using the weak encryption", the PC 109 is disconnected from the network. In particular, FIG. 6A displays warning 324, which says, "if the setting is turned ON, the PC is disconnected from the network. It is recommended to change the setting to establish the wireless LAN connection by "WPA2-AES" or to change to the wired LAN connection".

Thereafter, the setup unit 214 determines whether a user has performed an input to turn ON the setting of "restricting using the weak encryption" through the input/output unit 113 or not (S510). If it is determined that no input to turn ON the setting has been performed (S510: N), the processing ends. If it is determined that the input to turn ON the setting has been performed (S510: Y), the setup unit 214 stores in the memory 114 of the PC 109 that the setting of "restricting using the weak encryption" is valid. Then, the setup unit 214 changes the security setting for the wireless LAN to that not using the weak encryption (S511). In this embodiment, among the security settings available for the PC, "WPA2-AES" is only one that does not use the weak encryption. Therefore, the setup unit 214 changes the security setting for the wireless LAN to "WPA2-AES" and stores that in the memory 114.

Next, the setup unit 214 notifies the network communication control unit 211 of an instruction to re-establish the wireless LAN connection with new security setting (S512). The processing performed thereafter, i.e., the processing to determine whether the wireless LAN connection is successfully established or not (S513) is similar to the step of S508 so that the description thereof is omitted. If the connection is successfully established, the setup unit 214 ends the processing and the PC 109 is in a state of establishing the wireless LAN connection to the AP 101 by "WPA2-AES". If the connection failed, the setup unit 214 displays a warning screen indicating network connection error on the input/output unit 113 of the PC (S514). Then, the setup unit 214 ends the processing.

FIGS. 6B to 6D show examples of the warning screen displayed in the step of S514. The fact that the communication is discontinued is displayed on the warning screens. Further, the procedure for establishing communication by the encryption method not using the weak encryption or by the encryption method which satisfies the predetermined encryption strength is displayed on the warning screens. FIG. 6B shows a warning screen 331. The warning screen 331 shows a case where the encryption key, PSK, is not stored in the PC 109 for the encryption method which is not the weak encryption, i.e., "WPA2-AES" in this example. The warning screen 331 displays a reason of disconnection from the network. In this example, following is displayed as a reason of disconnection, i.e., "Use of weak encryption is restricted so that "WPA2-AES" is only allowed. Nevertheless, PSK is not stored."

Further, solution to reconnect to the network also is displayed on the warning screen 331. In this example, the followings are displayed as the solution: processing to set the PSK; processing to change the destination AP to input the appropriate PSK; and processing to connect the LAN cable to establish the wired LAN connection. Further, though it is not recommended, processing to invalid the setting of "restricting using the weak encryption" is also displayed. As mentioned, the reason of the disconnection from the network and its solution are displayed on the warning screen 331. Thereby, the user can easily understand the reason of the disconnection from the network so that the user can easily know the processing to reconnect to the network.

FIG. 6C shows a warning screen 341. The warning screen 341 shows a case where the encryption key, PSK, is stored in the PC 109 for "WPA2-AES", however, the PSK does not match with the PSK set in the AP 101. The warning screen 341 displays the reason of disconnection from the network. In particular, following is displayed: "Use of weak encryption is restricted so that "WPA2-AES" is only allowed. The PSK stored in the PC 109 does not match with the PSK stored in the AP 101."

Further, solution to reconnect to the network is also displayed on the warning screen 341. In this example, the followings are displayed as the solution: processing to change the PSK of the AP, processing to change the destination AP to input the appropriate PSK; processing to reset the PSK for the wireless LAN connection; and processing to connect the LAN cable to establish the wired LAN connection. Further, though it is not recommended, processing to invalid the setting of "restricting using the weak encryption" is also displayed.

FIG. 6D shows a warning screen 351. The warning screen 351 shows a case where, due to the restriction of using the weak encryption, the encryption method which is not the weak encryption, i.e., "WPA2-AES" is only allowed in this example among the encryption methods available for the PC 109. The warning screen 351 displays the reason of disconnection from the network, which is the fact that the AP 101 does not support "WPA2-AES".

Further, solution to reconnect to the network is also displayed on the warning screen 351. In this example, the followings are displayed as the solution: processing to review the setting of the AP; processing to change the destination AP to input the appropriate PSK; processing to reset the PSK for the wireless LAN connection; and, processing to connect the LAN cable to establish the wired LAN connection. Further, though it is not recommended, processing to invalid the setting of "restricting using the weak encryption" is also displayed. The reason of the disconnection from the network and its solution are displayed on any of the warning screens 331 to 351. Thereby, the user can easily understand the reason of the disconnection from the network so that the user can easily know the processing to reconnect to the network.

Figure 7:
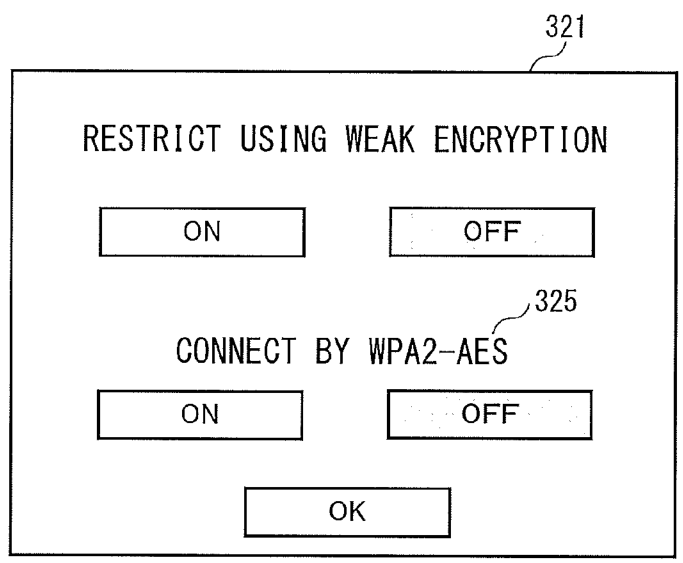
FIG. 7 is an exemplary diagram of a selection screen for connection using WPA2-AES.

Further, the warning screen of FIG. 6A may include the display for establishing the connection by the encryption method not using the weak encryption. For example, a selection screen to select whether to restrict using the weak encryption or not may be displayed together with a selection screen 325 to select whether to establish connection using WPA2-AES as the encryption method or not on the screen 321 shown in FIG. 6A. An example shown in FIG. 7 displays the selection screen 325, instead of the warning 324 shown in FIG. 6A. In this case, by selecting to establish the connection using WPA2-AES, the user can establish the wireless LAN connection to the AP 101 without using the weak encryption.

As mentioned, in the present embodiment, the description has been provided in a case where the security setting not using the weak encryption available for the PC 109 is "WPA2-AES" only. However, there may be a case where some security settings not using the weak encryption are available in the information device such as the PC 109. In that case, in the steps of S507, S511 to S513 described in FIG. 5, for each of the security settings, network connection is attempted. Among the encryption methods available for the PC 109, if any one of these succeeds in establishing the connection, it is regarded that the connection is successfully established and the processing thereafter can be performed.

Further, in the present embodiment, by validating the setting of "restricting using the weak encryption", in a case where the information device such as the PC 109 etc. is disconnected from the network 107, that fact can be notified in advance to the user. Thereby, it becomes possible to suppress a case where the communication is accidentally disconnected by the user who wrongly changes the setting, which prevents reduction of communication usability.

Further, in other embodiment, program for control is supplied to the memory 114 of the PC 109 through the network or a portable storage medium. Then, the program for control is read and executed by the CPU 111.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC) for performing the functions of one or more of the above-described embodiment(s), and by a method performed by the computer of the system or apparatus by, for example, and reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g.) central processing unit (CPU), micro processing unit (MPU) and may include a network of separate computers or separate processors to read out and execute the computer executable instructions. The computer executable instructions may be provided to the computer, for example and from a network or the storage medium. The storage medium may include, for example, one or more of a hard disk, and a random-access memory (RAM), a read only memory (ROM), a storage of distributed computing systems, an optical disk (such as a compact disc (CD)) digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-091435, filed Apr. 28, 2015 which is hereby incorporated by reference wherein in its entirety.

What is claimed is:

1. An information processing apparatus comprising:

a communication unit configured to establish communication with a communication relay device with one of a plurality of encryption methods;

a display unit configured to display at least a security policy setting screen and warning screen, the security policy setting screen being for determining whether or not to validate a security policy setting for setting whether to enable or disable the security policy of prohibiting the use of a weak encryption method that does not satisfy a predetermined encryption strength, wherein a warning that the network is disconnected by validating the security policy setting is displayed in the security policy setting screen;

at least one hardware processor; and at least one memory coupled to the at least one hardware processor and having instructions stored therein, wherein, upon execution of the stored instructions by the at least one hardware processor, the at least one hardware processor and the at least one memory cooperate to function as a reception unit configured to receive, via the setting screen, a first input from a user that indicates validation of the security policy setting for restricting establishing communication with an encryption method which does not satisfy the predetermined encryption strength; and a control unit configured to display on the display unit, after disconnection of communication with the communication relay device, a first screen, which is the warning screen indicating a reason for the disconnection of the previously established communication in a case where the reception unit has received the first input and the communication unit is re-establishing communication with the communication relay device having the disconnected communication previously established using the encryption method which does not satisfy the predetermined encryption strength, the first screen indicating that the encryption method used in the attempted communication between the communication unit and the communication relay device does not satisfy the predetermined encryption strength.

2. The information processing apparatus according to claim 1, wherein the control unit is further configured to determine whether the communication unit can establish communication with the communication relay device by the encryption method which satisfies the predetermined encryption strength or not after receiving the first input and display the first screen on the display unit in a case where it is determined that it is not possible to establish communication by the encryption method which satisfies the predetermined encryption strength.

3. The information processing apparatus according to claim 2, further comprising:

a storage unit for storing information required for establishing communication by the encryption method which satisfies the predetermined encryption strength, wherein the control unit is further configured to determine whether the information required for establishing communication by the encryption method which satisfies the predetermined encryption strength is stored in the storage unit or not and display the first screen on the display unit in a case where it is determined that the information is not stored in the storage unit.

4. The information processing apparatus according to claim 3, wherein the control unit is further configured to cause the communication unit to execute connection attempt with the communication relay device by the encryption method which satisfies the predetermined encryption strength using the information in a case where the information required for establishing communication by the encryption method which satisfies the predetermined encryption strength is stored in the storage unit and display the first screen on the display unit in a case where communication by the connection attempt is not established.

5. The information processing apparatus according to claim 3, further comprising:

an obtaining unit configured to obtain an encryption method for communication allowed by the communication relay device, wherein the control unit is further configured to determine whether at least one encryption method obtained can establish communication in the communication unit and matches with the encryption method which satisfies the predetermined encryption strength and display the first screen on the display unit in a case where it is determined that there is no encryption method which matches.

6. The information processing apparatus according to any one of the claims 1 to 5, wherein the control unit is further configured to display a second screen in a case where, after displaying the first screen, the communication by the encryption method which does not satisfy the predetermined encryption strength is restricted and the communication with the communication relay device is disconnected, the second screen displaying disconnection of the communication and processing to establish communication by the encryption method which satisfies the predetermined encryption strength.

7. The information processing apparatus according to claim 6, wherein the communication unit and the communication relay device establish the communication by encryption wireless communication, the communication relay device being an access point for the wireless communication.

8. An information processing method performed by an information processing apparatus comprising a communication unit which establishes communication with a communication relay device in any one encryption method among one or more encryption methods and a display unit, the display unit being configured to display at least a security policy setting screen and warning screen, the security policy setting screen being for determining whether or not to validate a security policy setting for setting whether to enable or disable the security policy of prohibiting the use of a weak encryption method that does not satisfy a predetermined encryption strength, wherein a warning that the network is disconnected by validating the security policy setting is displayed in the security policy setting screen, wherein the information processing apparatus determines, in response to an input from a user that indicates validation of the security policy setting for restricting establishing communication with an encryption method which does not satisfy predetermined encryption strength via the setting screen, and after disconnection of communication with the communication relay device, whether the encryption method being used to re-establish communication between the communication unit and the communication relay device having the disconnected communication previously established using the encryption method which does not satisfy the predetermined encryption strength, satisfies the predetermined encryption strength, and displays a first screen, which is the warning screen indicating a reason for the disconnection of the previously established communication, on the display unit in a case where it is determined that the encryption method does not satisfy the predetermined encryption strength, the first screen indicating that the encryption method used in the attempted communication between the communication unit and the communication relay device does not satisfy the predetermined encryption strength.

* * * * *